Figure 1:
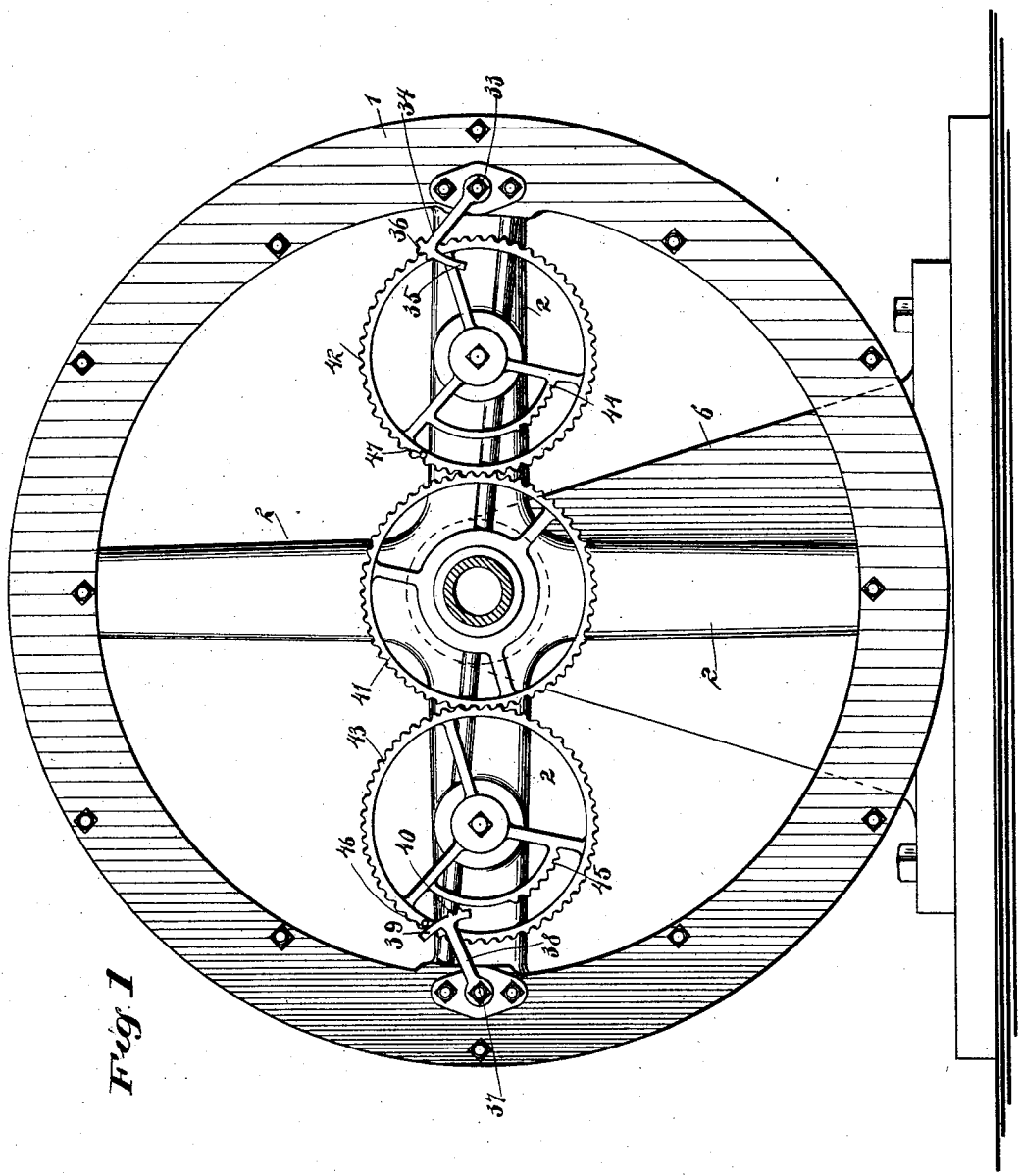

(No Model.) 4 Sheets—Sheet 1.
A. STEPHENS.
ROTARY ENGINE.

No. 605,760. Patented June 14, 1898.

WITNESSES:

INVENTOR
A. Stephens.
BY
ATTORNEYS.

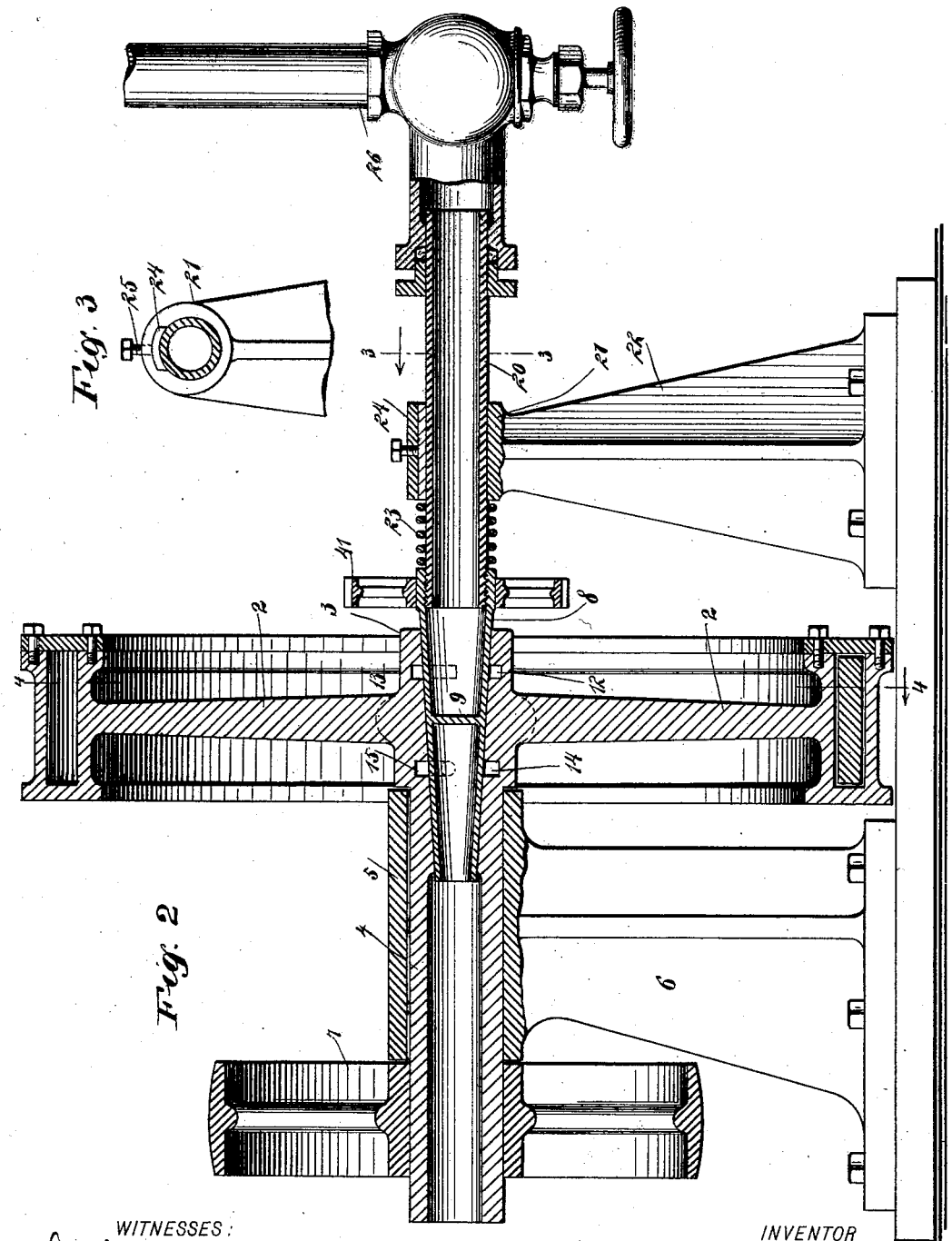

(No Model.) 4 Sheets—Sheet 3.
A. STEPHENS.
ROTARY ENGINE.
No. 605,760. Patented June 14, 1898.
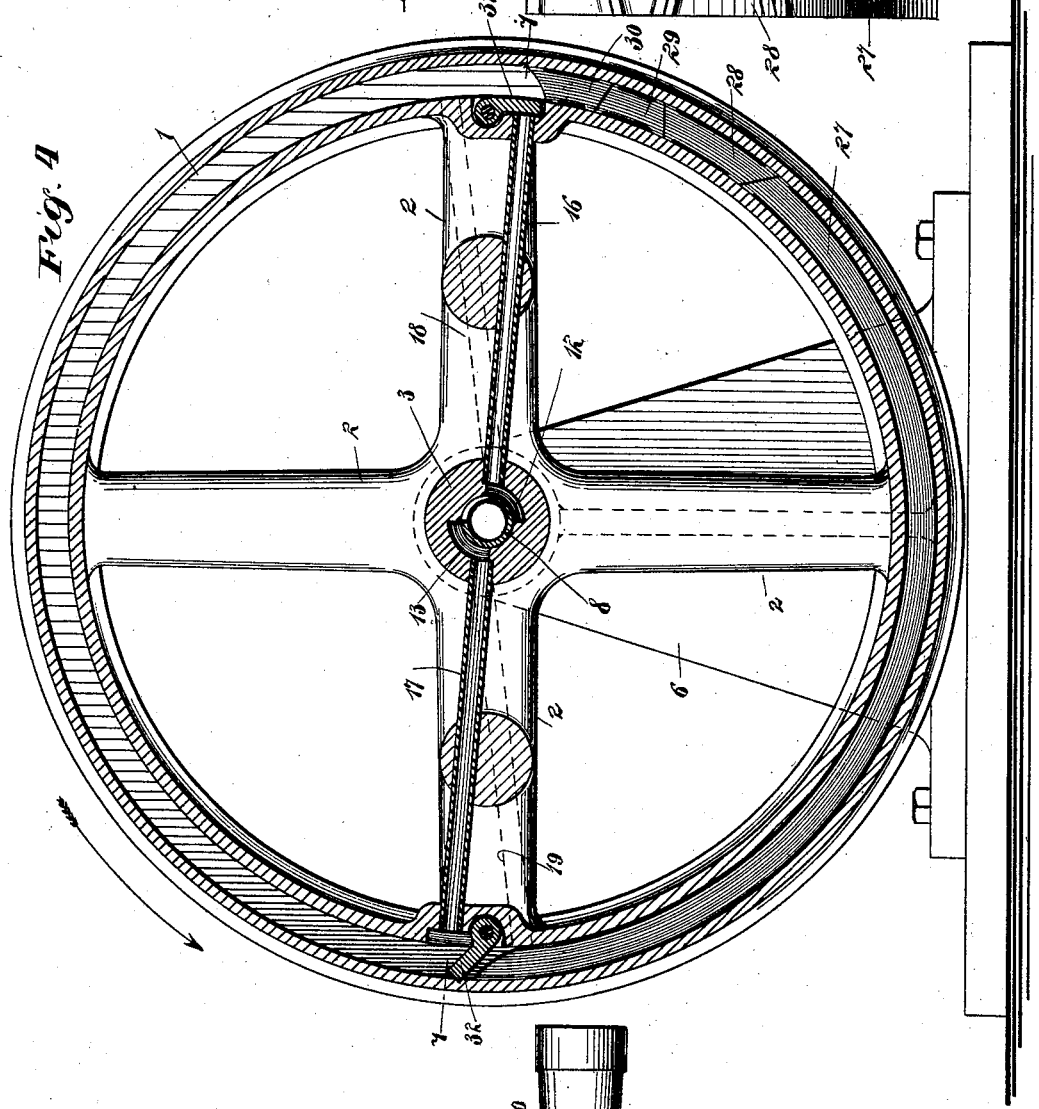
WITNESSES:
INVENTOR
A. Stephens.
BY
ATTORNEYS.

(No Model.) 4 Sheets—Sheet 4.
A. STEPHENS.
ROTARY ENGINE.
No. 605,760. Patented June 14, 1898.
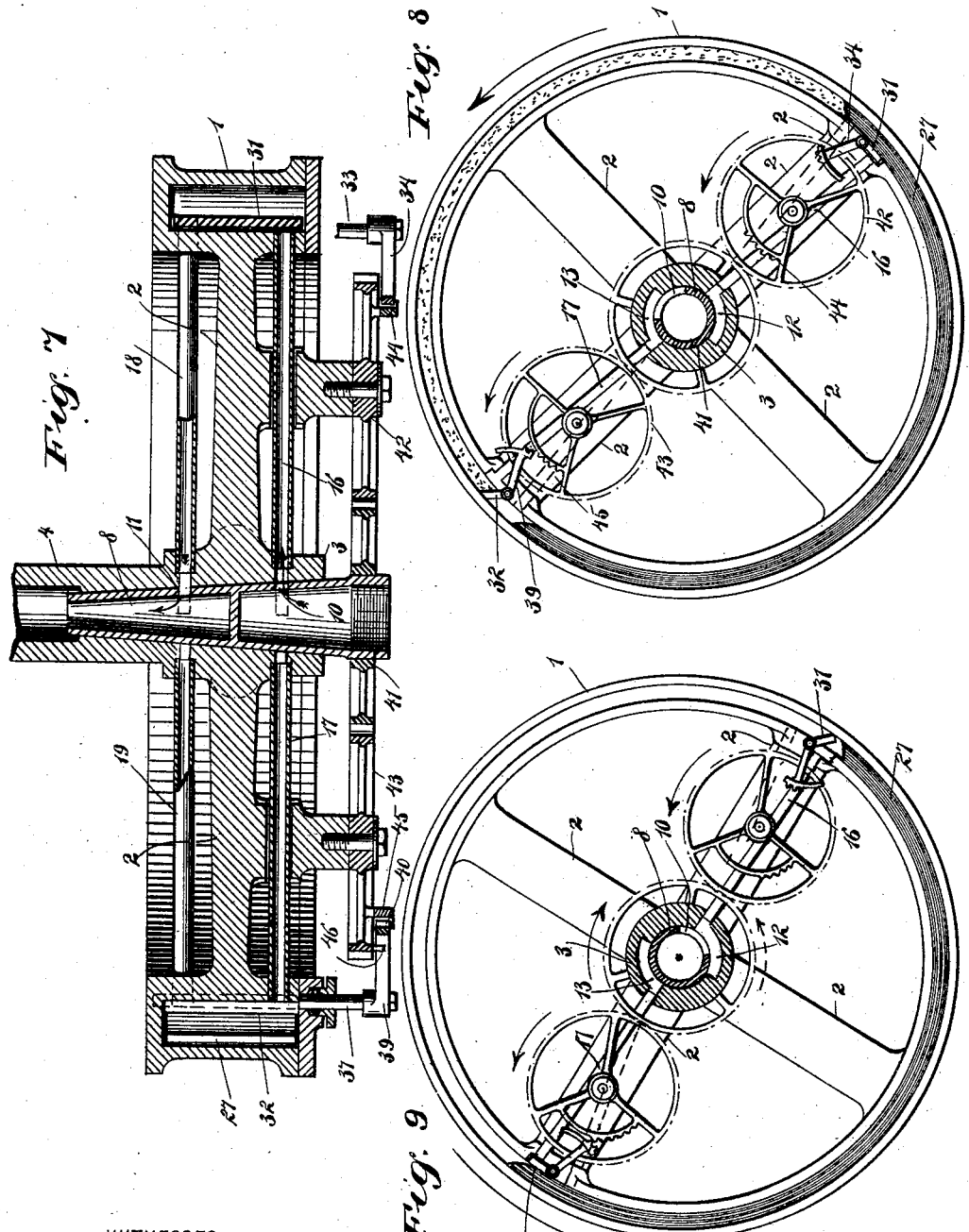
WITNESSES:
INVENTOR
A. Stephens
BY
ATTORNEYS.

UNITED STATES PATENT OFFICE.

ALEJANDRO STEPHENS, OF GUADALAJARA, MEXICO.

ROTARY ENGINE.

SPECIFICATION forming part of Letters Patent No. 605,760, dated June 14, 1898.

Application filed October 15, 1897. Serial No. 655,345. (No model.)

*To all whom it may concern:*

Be it known that I, ALEJANDRO STEPHENS, of Guadalajara, State of Jalisco, Mexico, have invented new and useful Improvements in Rotary Engines, of which the following is a full, clear, and exact description.

This invention relates to engines of the rotary type; and the object is to provide an engine of this class having extreme simplicity in its construction and operation, of greater efficiency than the usual engine, because it has no clearance-spaces nor reciprocating parts, and in which there are no dead-centers, thus dispensing with the use of a fly-wheel.

I will describe a rotary engine embodying my invention, and then point out the novel features in the appended claims.

Reference is to be had to the accompanying drawings, forming a part of this specification, in which similar characters of reference indicate corresponding parts in all the views.

Figure 1 is a side elevation of an engine embodying my invention. Fig. 2 is a sectional elevation thereof. Fig. 3 is a section on the line 3 3 of Fig. 2. Fig. 4 is a section on the line 4 4 of Fig. 2. Fig. 5 is a side view of an abutment employed. Fig. 6 is a plan view of a valve employed. Fig. 7 is a section on the line 7 7 of Fig. 4. Fig. 8 is a partial section and partial elevation showing the parts in one position, and Fig. 9 is a similar view but showing the parts in another position.

The cylinder 1 is made in the form of the rim of a wheel, and it is supported on spokes 2, which radiate from a hub 3. This hub 3 is tubular and has an extension 4, mounted to rotate in a bearing 5, formed on the upper end of a pillow-block 6. This extension 4 of the hub is also tubular, and on its outer end a band-wheel 7 is secured. The opening in the hub 3 is longitudinally tapered, and engaging in said hole or opening is a correspondingly-shaped tubular valve 8, having a central partition 9.

At one side of the central partition 9 the valve 8 is provided with a port 10, through which the actuating-steam is designed to pass, and at the opposite side of the partition 9 the said valve is provided with an exhaust-port 11. These ports 10 and 11 are elongated circumferentially of the valve. The port 10 is designed at certain times to register with chambers 12 and 13, formed in the interior of the hub and one diametrically opposite the other. Similar chambers 14 and 15 are formed in the hub and designed at certain times to register with the exhaust-port 11. From the chamber 12 a steam-inlet pipe 16 leads through the inner wall of the cylinder and communicates with the interior of the cylinder, and from the chamber 13 a similar pipe 17 leads through the inner wall of the cylinder and communicates with the interior thereof. Exhaust-pipes 18 and 19 lead from the chambers 14 and 15 through the inner wall of the cylinder. The ends of said pipes 18 and 19, however, communicate with the interior of the cylinder at a short distance from the pipes 16 and 17.

At its outer end the valve 8 is connected to a steam-pipe 20, mounted to rotate in a bearing 21 on a pillow-block 22. The steam-pipe 20 is mounted to have a longitudinal movement as well as a rocking or rotary movement. The object of the longitudinal movement is to force the tapered valve 8 tightly in its seat. This is done by means of a spring 23, surrounding the pipe 20 and bearing at one end against the bearing 21 and at the other end against the valve 8. The pipe 20 is designed to be friction-tight in the bearing 21, so as not to rotate excepting when pressure is brought to bear upon it, as will be hereinafter described. This friction-bearing may be regulated by means of a plate 24, seated in a recess formed in the bearing 21, and adjusted by means of a bolt 25, engaging in a tapped hole in the wall of the bearing. At its outer end the pipe 20 has a rotary-joint connection with the valve-controlled steam-pipe 26.

Arranged in the cylinder 1 is a segmental abutment 27. This segmental abutment will be made from iron or other suitable metal and of great weight. To reduce friction, the abutment has short bearing portions at its ends only. These bearing portions will engage with the opposite walls of the cylinder. To make the abutment steam-tight, however, I form it with several sections 28, 29, and 30 at its steam-pressure end. These sections have their ends oppositely inclined, the end of one section bearing upon the end of another section. Therefore when steam-pressure is exerted upon the end of the section 30 the said section will be pressed tightly against the inner side of the outer wall of the cylinder. The section 29 will be pressed in the opposite direction to engage against the inner wall of the cylinder, and the section 28 will be pressed outward. Thus a practically steam-tight packing is formed. The sections 28, 29, and 30 are practically a portion of the abutment. This abutment has a length slightly less than one-half the circumference of the cylinder, and its end opposite the end 30 is inclined or rounded upward and outward, as plainly shown in Fig. 4.

Movable transversely of the cylinder at the end of the pipe 16 is a piston-valve 31. The inner wall of the cylinder is provided with a depression, into which the valve 31 may pass and engage over the end of the pipe 16. A similar valve 32 is provided at the end of the pipe 17. The valve 31 is mounted on a rod 33, having bearings in the side walls of the cylinder, and to the outer end of this rod an arm 34 is attached. This arm 34 has at its free end a finger 35, which extends substantially at right angles to the arm, and it also has two teeth 36 at its end. The piston-valve 32 is similarly mounted on a rod 37, from which an arm 38 extends, having a finger 39 and two teeth 40.

Secured rigidly to the valve 8 is a gear-wheel 41, meshing with gear-wheels 42 and 43, mounted to rotate on studs extended from spokes of the cylinder. The gear-wheel 42 is provided with a segment-rack 44, designed at a certain time to engage with the finger 35, and the wheel 43 has a similar segment-rack 45, designed at a certain time to engage with the teeth 40.

In operation the steam enters the valve 8 and passes through the steam-pipes 16, and the pressure of the steam raises the valve 31 in such manner as to extend it entirely across the cylinder. Then the steam acts by expansion between the end 30 of the abutment and the adjacent side of the piston-valve 31. This will first force the abutment a certain distance around the cylinder, as indicated in Fig. 8. The steam-pressure will of course be exerted against the end of the abutment and against the piston-valve 31. This will cause the cylinder to rotate in the direction indicated by the arrow in Fig. 4. As before stated, the segmental abutment will by its great weight diverge in the contrary direction just enough to equalize with its change of position the pressure which has been exerted upon the piston-valve 31.

A more detailed explanation of the manner in which the abutment 27 operates will be given in the following description: Before the admission of steam the abutment has its two ends on the same horizontal plane. Steam entering below the valve 31 raises it, and the steam then remains confined between the said valve and the end of the abutment. The expansive force of the steam lowers the end 30 of the abutment and raises its opposite end as much as may have been the strength which supported the valve 31. The pressure which may be exerted upon the abutment 27 may be such as to put it in the vertical position, this being the limit of power which a machine of this kind can attain. As seen, the valves act as pistons, and the abutment is equivalent to the heads of an ordinary reciprocating engine, with the exception that these heads are stationary and the abutment 27 is movable and acts only by its weight.

Having explained the working of the machine in its most essential parts, I will now explain the manner of varying the position of the valve 8 in order that the inlet of steam and outlet of the same may be regulated. The valve is designed to move axially about a quarter-revolution, the object being to permit it to follow the movements of the abutment 27 in its several positions, which object is attained automatically in the following manner:

In Fig. 4 the engine is shown in the position which it will have after the steam has operated upon the valve or piston 32 and at the moment of finishing its course from the right-hand side to the left-hand side, or to the position in which the valve 32 is placed. When in this position, the admission of steam has just closed, as indicated in Fig. 4. While in this position the valve will be slightly rotated to admit steam to the under side of the other piston, or to the piston at the right-hand side of the engine, and the operation thereof will complete the revolution of the cylinder. At the beginning of the operation of the steam upon the valve the rounded end of the abutment 27 will engage with the valve 32 and move the same into its chamber or recess formed in the inner wall of the cylinder. This movement of the valve will impart a circular movement of several degrees to the arm 38. In this position the arm 38 can effect its movement without engaging its teeth with those of the segment 45, and consequently without altering the position of the valve; but if the position of the abutment 27 should be changed during a half-revolution and the curved end be higher than the opposite end in this case the valve 32 would be closed before the wheel 43 could take its position shown in the drawings, and this would cause the teeth of the arm 38 to engage with the segment-rack 45, and this will impart a momentary increase of movement of the wheel 43 in the direction indicated by the arrow and the wheel 43 will move in a direction contrary to that of the gear 41, imparting a slight rotary movement to said gear 41, which in turn will vary the position of the valve 8. In this way it follows that in whatever position the abutment may be the steam-pressure end 30 will be in line with the inlet-port 10. If, on the contrary, all or part of the steam is shut off when the abutment has varied its position, and with it the valve 8 has also changed its position, the result will be that as it is no longer receiving pressure on the end 30 the abutment will resume its normal position—that is, with its two ends on the same horizontal plane. As in this case the valve 32 will not close until it comes in contact with the end of the abutment, a bolt or pin extended outward from the wheel 43 near its periphery will come in contact with the curved finger 39, and thus prevent the wheel 43 from revolving and compel the valve 8 to take its position with relation to the abutment. Of course the wheel 42 will be provided with an outwardly-extended pin 47 for the same purpose that the pin 46 is employed. The exhaust-ports will be regulated in a similar manner to the inlet-ports, and of course the steam forward of the piston will be forced out through the exhaust.

Having thus described my invention, I claim as new and desire to secure by Letters Patent—

1. An engine comprising a rotary cylinder, an abutment therein, a controlling-valve, a gear-wheel secured to the controlling-valve, a piston-valve mounted to swing in the cylinder and means for imparting movement to the said gear-wheel from the said piston-valve to actuate the controlling-valve, substantially as specified.

2. A rotary engine comprising a rotary cylinder, a segmental abutment loosely mounted in the cylinder, the said abutment being formed with independent sections at its steam-pressure end, the said sections having their ends oppositely inclined and the end of one section bearing upon the end of another section, substantially as specified.

3. An engine comprising a rotary cylinder, means for controlling the inlet and outlet of steam, and a segmental abutment in the cylinder having short bearing portions for engaging the opposite walls of the cylinder, the said abutment being formed with sections at its steam-pressure end, the said sections having their ends oppositely inclined and the end of one section bearing upon the end of another section, substantially as specified.

4. A rotary engine comprising a wheel-like cylinder, a segmental abutment in the cylinder having short bearing portions for engaging the opposite walls of the cylinder, the said abutments being formed with sections at its steam-pressure end, the said sections having their ends oppositely inclined and the end of one section bearing upon the end of another section, piston-valves mounted to swing in the cylinder, steam-inlet pipes extending through the inner wall of the cylinder in line with the piston-valves, a controlling-valve and means for giving a rocking motion to the said controlling-valve substantially as specified.

5. An engine comprising a rotary cylinder, a segmental abutment loosely mounted in the cylinder and formed with sections at its steam-pressure end, the said sections having their ends oppositely inclined and the end of one section bearing upon the end of another section, a tubular hub in which the cylinder is mounted, said tubular hub having steam-chambers formed in its inner walls, said chambers having communication with the interior of the cylinder, piston-valves in the cylinder adapted to engage over the inner ends of said communications, a tubular valve in the hub portion having steam inlet and exhaust ports, and means whereby the movement of the piston-valves imparts a rocking movement to the said tubular valve, substantially as specified.

6. An engine, comprising a rotary cylinder, a segmental abutment loosely mounted in the cylinder, oppositely-arranged piston-valves movable in the cylinder, steam-inlet pipes, a controlling-valve for the steam, a gear-wheel rigidly secured to the said controlling-valve, and gear-wheels meshing with the gear secured to the controlling-valve and actuated from the said piston-valves, substantially as specified.

7. A rotary engine, comprising a rotating cylinder, an abutment therein, a controlling-valve engaged in the hollow hub of the cylinder, a gear-wheel attached to said valve, gear-wheels mounted on studs carried by the cylinder and engaging at opposite sides with the first-named gear-wheel, segmental racks on said outer gear-wheel, piston-valves mounted to swing in the cylinder, arms extended from the shafts of said piston-valves, fingers extended at substantially right angles to said arms, and teeth on said fingers for engaging the segment-racks on the wheels, substantially as specified.

8. An engine comprising a rotary cylinder, an abutment therein, piston-valves mounted to swing in the cylinder, a tubular hub on which the cylinder is mounted, a tubular valve engaging the opening in the hub, a partition intermediate of the ends of the tubular valve, the said valve being provided with a steam-inlet port at one side of the partition and an exhaust-port at the other side of the partition, pipes providing communication between said ports and the interior of the cylinder, a steam-pipe connecting with the said valve a spring for holding the valve yieldingly in its seat, a tension-adjusting device for the steam-pipe, and a connection between the said piston-valves and the said tubular valve, whereby the swinging of the piston-valves imparts a rocking motion to the said tubular valve, substantially as specified.

ALEJANDRO STEPHENS.

Witnesses:
JNO. M. RITTER,
C. R. FERGUSON.